US007979168B2

(12) United States Patent
Velez et al.

(10) Patent No.: US 7,979,168 B2
(45) Date of Patent: *Jul. 12, 2011

(54) POWERED DEVICE INCLUDING A MULTI-USE DETECTION RESISTOR

(75) Inventors: Alejandro Velez, Austin, TX (US); D. Matthew Landry, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 477 days.

This patent is subject to a terminal disclaimer.

(21) Appl. No.: 12/208,533

(22) Filed: Sep. 11, 2008

(65) Prior Publication Data

US 2009/0001956 A1 Jan. 1, 2009

Related U.S. Application Data

(63) Continuation-in-part of application No. 11/492,367, filed on Jul. 25, 2006, now Pat. No. 7,548,799.

(51) Int. Cl.
G06F 1/26 (2006.01)
(52) U.S. Cl. .......................... 700/297; 324/524; 323/267
(58) Field of Classification Search .......... 713/300–330, 713/297; 324/530–534; 323/280, 282–284, 323/277; 700/295–297
See application file for complete search history.

(56) References Cited

U.S. PATENT DOCUMENTS

| 4,434,474 | A | 2/1984 | Best et al. ..................... 364/900 |
| 4,495,603 | A | 1/1985 | Varshney ...................... 365/233 |
| 4,628,480 | A | 12/1986 | Floyd ............................ 364/900 |
| 5,004,970 | A | 4/1991 | Barou ............................ 323/277 |
| 6,115,468 | A | * | 9/2000 | De Nicolo ..................... 379/413 |
| 6,184,744 | B1 | 2/2001 | Morishita ..................... 327/541 |
| 6,836,472 | B2 | 12/2004 | O'Toole et al. ............... 370/335 |
| 6,909,320 | B2 | 6/2005 | Chan et al. .................... 327/541 |
| 6,996,458 | B2 | 2/2006 | Pincu et al. ................... 700/297 |
| 7,046,983 | B2 | * | 5/2006 | Elkayam et al. .............. 455/402 |
| 7,050,315 | B2 | * | 5/2006 | Itoh ................................ 363/60 |
| 7,071,664 | B1 | 7/2006 | Teggatz et al. ............... 323/280 |
| 7,145,315 | B2 | 12/2006 | Wang ............................ 323/282 |
| 7,170,265 | B2 | 1/2007 | Whittaker ..................... 323/267 |
| 7,194,037 | B1 | 3/2007 | Sutardja ........................ 375/258 |
| 7,281,141 | B2 | * | 10/2007 | Elkayam et al. .............. 713/300 |
| 7,356,588 | B2 | 4/2008 | Stineman, Jr. et al. ....... 709/224 |
| 7,378,824 | B2 | 5/2008 | Chuang et al. ................ 323/282 |
| 7,782,094 | B2 | * | 8/2010 | Vorenkamp ..................... 327/51 |
| 2006/0164098 | A1 | 7/2006 | Su ................................. 324/534 |
| 2008/0005598 | A1 | 1/2008 | Landry et al. ................. 713/300 |

* cited by examiner

Primary Examiner — Rajnikant B Patel
(74) Attorney, Agent, or Firm — Polansky & Associates, P.L.L.C.; R. Michael Reed

(57) ABSTRACT

In a particular embodiment, a method includes receiving a powered device (PD) detection signal at a PD from a powered network and applying the PD detection signal to an external resistor to provide a detection signature to the powered network. Further, the method includes receiving a PD classification mark signal at the PD, applying the received PD classification mark signal to the external resistor, and selectively activating a classification mark current path in parallel with the external resistor to produce a classification mark signature.

21 Claims, 6 Drawing Sheets

POWERED DEVICE INCLUDING A MULTI-USE DETECTION RESISTOR

CROSS-REFERENCE TO RELATED APPLICATION(S)

This application is a continuation-in-part of and claims priority from U.S. patent application Ser. No. 11/492,367, filed on Jul. 25, 2006, and entitled "POWERED DEVICE INCLUDING A DETECTION SIGNATURE RESISTOR," which is incorporated herein by reference in its entirety.

FIELD

The present disclosure is generally related to powered devices in Power over Ethernet (PoE) networks, and more particularly to powered devices including a multi-use detection resistor.

BACKGROUND

Power over Ethernet (PoE), which is outlined in IEEE Std 802.3-2005 clause 33 (the PoE standard), refers to a technique for delivering power and data to an electronic device via Ethernet cabling. PoE eliminates the need for a separate power source to deliver power to attached powered devices. In a PoE system, a power sourcing equipment (PSE) device provides a power supply to electronic devices, which may be referred to as powered devices (PDs), via an Ethernet cable. Such PDs may include voice over Internet protocol (VoIP) telephones, wireless routers, security devices, network devices, field devices to monitor process control parameters, data processors, other devices, or any combination thereof.

The PoE standard specifies that the PSE device perform a powered device detection operation to determine whether the PD is attached before supplying power via the Ethernet cable. To perform the PD detection operation, the PSE device applies a DC voltage (within a range of 2.8 to 10 Volts DC) to pairs of wires of the Ethernet cable and monitors a received current (Amps) or a received voltage (V) to detect a resistance (i.e., a PD detection signature) within an expected range (e.g., between 19 and 26.5 K-ohms). If the PSE device does not detect a valid resistance, the PSE device does not apply power to the Ethernet port assigned to the PD.

Once a PD has been detected, the PoE standard specifies that the PSE device may optionally perform a PD power classification operation to determine power requirements of the detected PD. Such power requirements may be used by the PSE device to manage its power budget. The PoE Standard specifies five device classes, classes zero through four (0-4), which classes define expected power consumption levels for particular categories (classes) of PDs. If the PSE device supports power classification, the PSE device applies a PD classification voltage (DC) to the Ethernet port associated with the detected PD and monitors the Ethernet port to detect a PD classification signature associated with the detected PD. A current level associated with the PD classification signature corresponds to a particular classification and specifies the PD's power classification. For example, a current signature between zero and four mA corresponds to class 0, which is also the default class for PDs that do not support classification. A current draw of 26 to 30 mA and of 36 to 44 mA corresponds to class 3 and class 4 devices, respectively. The PoE standard specifies that PDs in classes 0, 3, or 4 expect a power supply of approximately 15.4 watts. A current draw of between 9 and 12 mA corresponds to a class 1 device, and the PoE standard specifies that the PSE provide a power supply of up to approximately 4 watts to a class 1 device. A class 2 device corresponds to a current draw of 17 to 20 mA and requires the PSE to provide a power supply of approximately 7 watts of power.

A revised PoE standard, which can be referred to as the PoE "Plus" Standard (the PoE+ Standard), makes use of the class 4 classification to detect a PoE+ enabled PD. In a particular example, a current draw of 36 to 44 mA (class 4) can identify the PD as being a PoE+ enabled PD. In response to detecting a class 4 PD classification signature, under the PoE+ Standard, the PSE device may perform a PoE+ classification process, which includes one or more additional PD classification voltages applied for periods of time that are separated by classification mark voltages. During application of the PD classification voltages, the PD is expected to provide a PD classification signature (such as a current signature that corresponds to the power classification of the PD). During application of the classification mark voltages, the PD provides a PD classification mark signature (such as a classification mark current within a current range from 0.25 mA to 4 mA).

Hence, there is a need for circuitry to provide the PD detection and PD classification signatures. Embodiments disclosed herein can provide solutions to these and other problems, and offer other advantages over the prior art.

SUMMARY

In a particular embodiment, a method includes receiving a powered device (PD) detection signal at a PD from a powered network and applying the PD detection signal to an external resistor to provide a detection signature to the powered network. Further, the method includes receiving a PD classification mark signal at the PD, applying the received PD classification mark signal to the external resistor, and selectively activating a classification mark current path in parallel with the external resistor to produce a classification mark signature.

In another particular embodiment, a Power over Ethernet (PoE) powered device includes an external resistor having a first terminal and a second terminal and includes an integrated circuit. The integrated circuit includes a first pin coupled to the first terminal of the external resistor and coupled to a first power supply terminal and includes a second pin coupled to the second terminal of the external resistor. The integrated circuit further includes a first logic circuit to selectively couple the second pin to a second power supply terminal via a first current path in response to a powered device (PD) detection signal to produce a PD detection signature. Additionally, the integrated circuit includes a second logic circuit to selectively couple the second pin to the second power supply terminal via a second current path in response to a PD classification mark signal. The second current path includes a current source in parallel with the external resistor to produce a PD classification mark signature.

In still another particular embodiment, a circuit device includes an interface coupled to a cable to receive power and data, a first power supply terminal coupled to the interface, and a second power supply terminal coupled to the interface. The circuit device further includes a first pin coupled to the first power supply terminal and to a first terminal of an external resistor and a second pin coupled to a second terminal of the external resistor. The circuit device also includes logic circuitry coupled to the interface and adapted to detect a first signal at the interface and to selectively couple the second pin to the second power supply terminal via a first current path in response to detecting the first signal to produce a first current. The powered device is further adapted to detect a second signal at the interface and to selectively couple the second pin to the second power supply terminal via a second current path that places a first current source in parallel with the external resistor in response to detecting the second signal to produce a second current.

DETAILED DESCRIPTION OF ILLUSTRATIVE EMBODIMENTS

Figure 1:
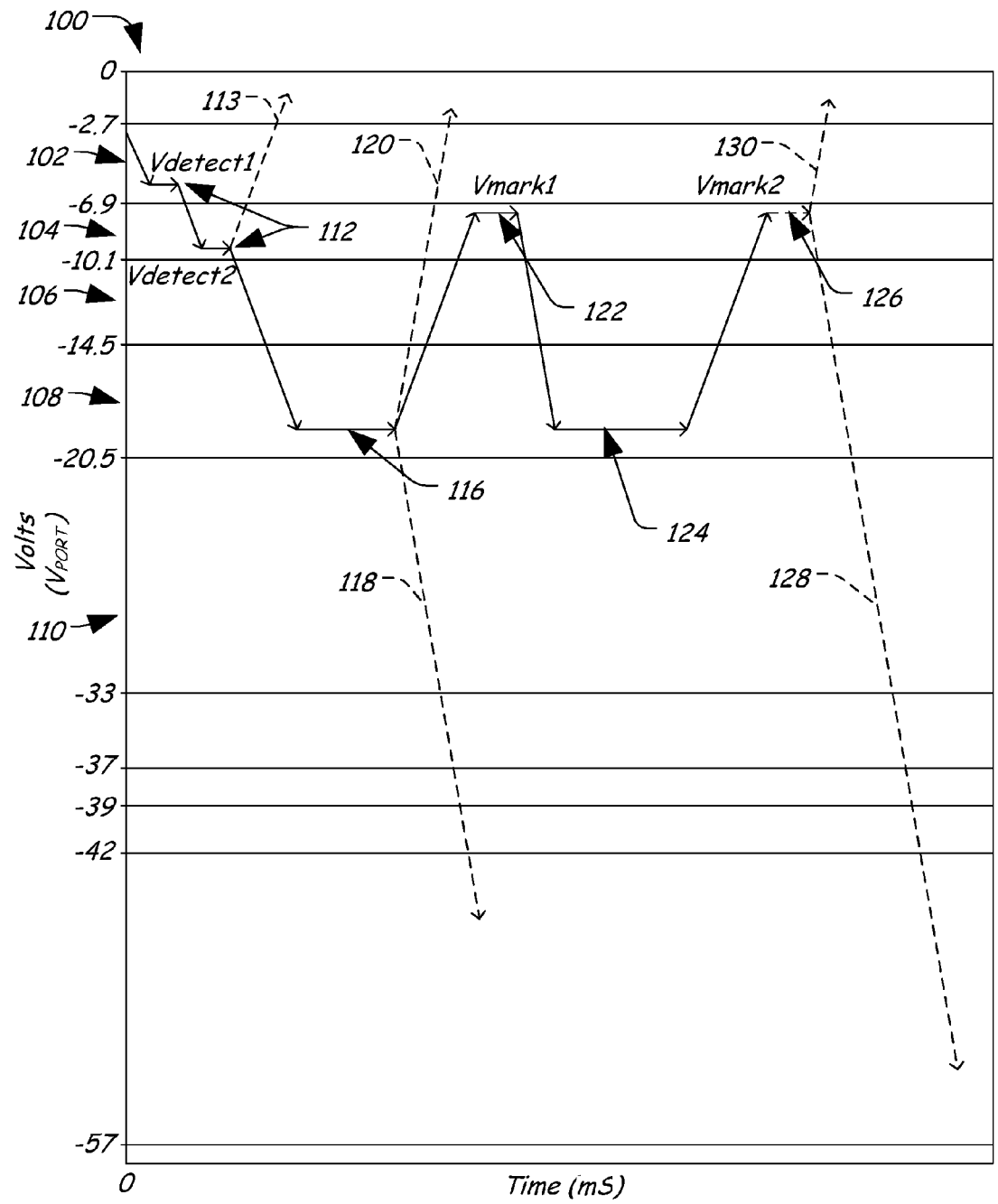
FIG. 1 is a graph of a particular representative embodiment of a Power over Ethernet (PoE) system including a powered device (PD) detection and classification voltage over time at a voltage port of the PD.

FIG. 1 is a graph 100 of a particular representative embodiment of a Power over Ethernet (PoE) powered device (PD) detection and classification (port) voltage over time at a voltage port of the PD, which port voltage is received from a power sourcing equipment (PSE) device. The graph 100 illustrates a detect and reset region 102 within a range from −2.7 volts to −6.9 volts. The graph 100 also shows a detect and mark region 104 between −6.9 volts and −10.1 volts. Further, the graph 100 illustrates a mark threshold region 106 between −10.1 volts and −14.5 volts and a classification region 108 between −14.5 volts and −20.5 volts. Additionally, the graph 100 illustrates an operating power supply range that is between −42 volts and −57 volts. It should be understood that the graph 100 illustrates a particular example of a negative power supply. In an alternative example, the graph 100 could be presented as positive detection and classification signals by inverting the voltages.

The graph 100 illustrates a port voltage at an input port of a powered device. A PSE device can apply powered device (PD) detection signals (Vdetect1 and Vdetect2) 112 to the port of the powered device. The PD can apply the PD detection signals 112 to an external precision resistor of the powered device to provide a PD detection signature. By applying two PD detection signals 112, the PSE device can measure two PD signatures (such as two current levels) and can use the measured PD signatures to determine a voltage-current slope that reflects a resistance (i.e., a PD detection resistor). If the measured PD detection signatures indicates a resistance that is outside of a range from approximately 19 kΩ to approximately 26.5 kΩ, then the PSE device turns off power to the input port (as indicated at 113).

If a valid PD detection resistance is detected, the PSE device can provide an operating voltage that is within a range from approximately −42 volts to −57 volts and a power supply of approximately 15.4 Watts. Optionally, under the PoE Standard, the PSE device can supply a PD classification signal 116 within the classification range 108 (i.e., between −14.5 volts and −20.5 volts). If the PSE device detects a valid PD classification signature in response to the PD classification signal 116, the PSE can provide an operating voltage within the range from −42 volts to −57 volts and a power supply that is based on the determined PD classification (e.g., approximately 15.4 Watts). If the PSE device does not detect a valid PD classification signature, the PSE device can either reset and provide no power supply to the port (as indicated at 120) or provide the default operating voltage as indicated at 118.

Under the PoE Plus Standard, multiple PD classification signals can be provided, such as the PD classification signals 116 and 124, which signals are separated by PD classification mark signals 122 and 126. The PD classification mark signals 122 and 126 are within the detect and mark region 104 between −6.9 volts and −10.1 volts. In a particular embodiment, the PSE device can apply multiple classification signals, such as the PD classification signals 116 and 124, and a corresponding number of PD classification mark signals 122 and 126.

In response to the PD classification mark signals 122 and 126, the PD is adapted to provide a PD classification mark signature, which can be in a range from approximately 0.25 mA to approximately 4 mA. The PSE applies the second PD classification signal 124, and the PD provides a PD classification signature in response to the second PD classification signal 124. The PSE then applies the second mark signal 126, and the PD provides the PD classification mark signature. Depending on the implementation, the PSE can be adapted to apply any number of PD classification signals, such as the signals 116 and 124, separated by a corresponding number of PD classification mark signals, such as the signals 122 and 126.

In this particular example, after the second PD classification signal 124, at least one second PD classification mark signal 126 is provided. If the PSE device detects a valid PD classification mark signature, the PSE can provide a voltage within the operating voltage range (as indicated at 128) and at a power level corresponding to the particular classification associated with the powered device. However, if the PSE does not detect a valid PD classification mark signature, the PSE can reset and provide no power supply to the port (as indicated at 130).

To operate in conjunction with the PoE Standard, the PoE Plus Standard, or other standards that may emerge in the future, a powered device can be adapted to provided multiple responsive signals, such as a PD detection signature, a PD classification signature, a PD classification mark signature, other signatures or signals, or any combination thereof. Further, the graph 100 is illustrative only and is intended to provide an understanding of a particular embodiment of a powered device detection and classification process for the PoE Standard or the PoE+ Standard. However, while the voltage levels may vary, the process of detection and classification may be performed in a similar manner in a broadband over power line implementation as well.

Figure 2:
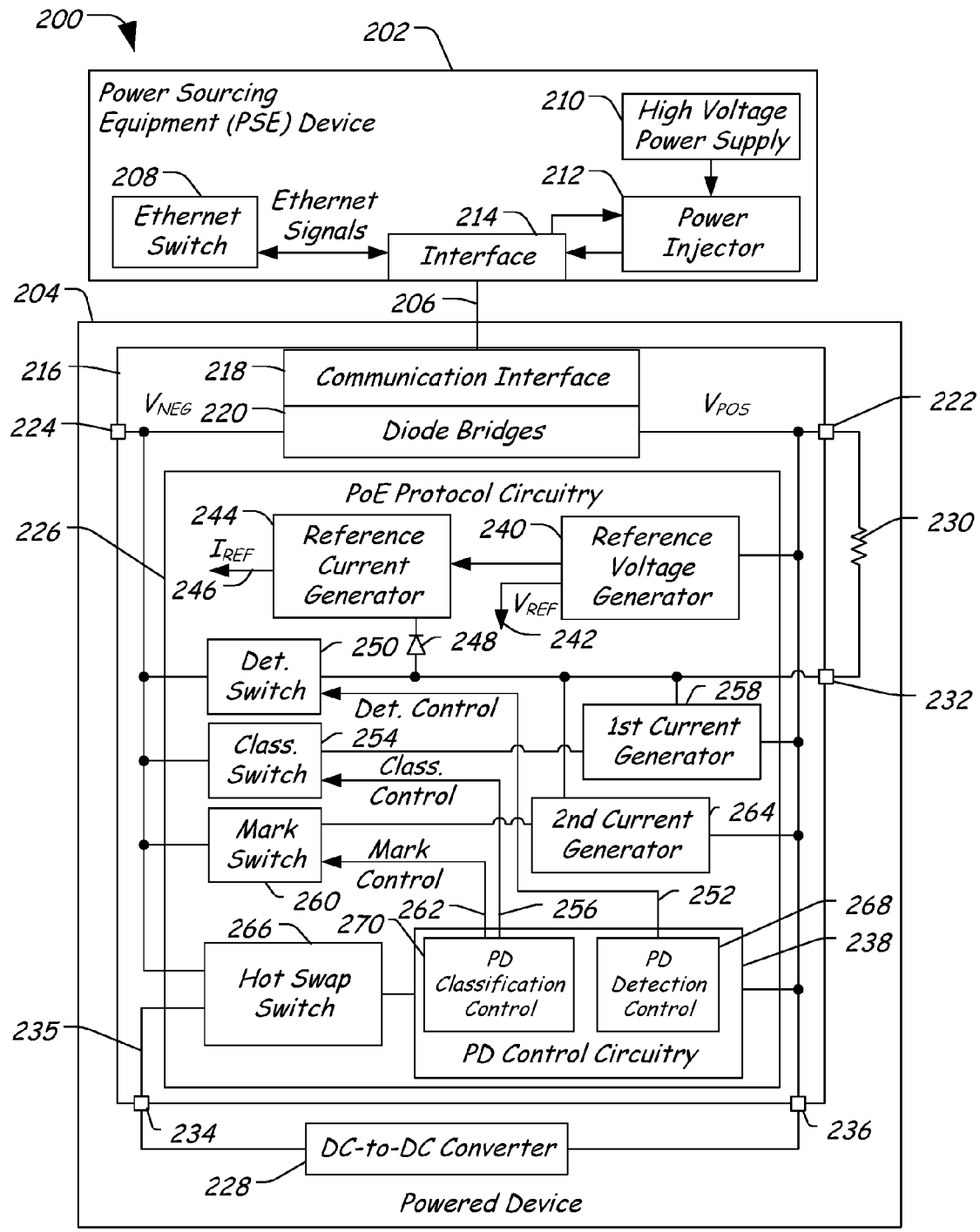
FIG. 2 is a diagram of a particular illustrative embodiment of a power over Ethernet (PoE) system including a powered device with a multi-use pin and including a PoE detection and classification controller and a reference current generator.

FIG. 2 is a diagram of a particular illustrative embodiment of a power over Ethernet (PoE) system 200 including a powered device 204 with a multi-use pin 232 and including powered device (PD) control circuitry 238 to selectively utilize an external resistor 230 to provide a PD detection signature, a PD classification signature, a PD classification mark signature, other signatures, or any combination thereof. The system 200 includes a power sourcing equipment (PSE) device 202 and the powered device 204, which are communicatively coupled by a network cable 206, such as a twisted pair CAT5e Ethernet cable.

The PSE device 202 may include an Ethernet switch 208, a high voltage power supply 210, and a power injector 212, which are coupled to an interface 214 to inject power and data onto wires of the network cable 206. In general, though only a single powered device 204 is shown, it should be understood that the PSE device 202 may be coupled to multiple powered devices. In a particular embodiment, the PSE device 202 can include a plurality of network nodes, and each of the plurality of network nodes may be coupled to a respective powered device, such as the powered device 204, via a corresponding network cable 206.

The powered device 204 is adapted to derive power and receive data from the network cable 206. The powered device 204 includes at least one integrated circuit 216 that includes a communication interface 218, which is adapted to connect to the network cable 206. The integrated circuit 216 further includes one or more diode bridges 220 coupled to the communication interface 218 to rectify a power supply received via the network cable 206. The one or more diode bridges 220 provide a positive power supply ($V_{POS}$) to a positive power supply pin 222 and a negative power supply ($V_{NEG}$) to a negative power supply pin 224. An external resistor 230 includes a first terminal coupled to the positive supply pin 222 and a second terminal coupled to a multi-use pin 232. The powered device 204 further includes a direct-current (DC)-to-DC converter 228, which is coupled between pins 234 and 236 and which is adapted to provide a regulated power supply to one or more circuits (not shown). In an alternative embodiment, one or both of the one or more diode bridges 220 and the communication interface 218 may be separate from and coupled to the integrated circuit 216.

The integrated circuit 216 includes Power over Ethernet (PoE) protocol circuitry 226, which is coupled to the positive and negative supply pins 222 and 224. The PoE protocol circuitry 226 includes a reference voltage generator 240 that is coupled to the positive supply pin 222 and that is adapted to produce a reference voltage (VREF) 242. The PoE protocol circuitry 226 further includes a reference current generator 244 that is adapted to produce a reference current ($I_{REF}$) 246. The reference current generator 244 is coupled to the multi-use pin 232 via an isolating diode 248. The PoE protocol circuitry 226 further includes PD control circuitry 238, which is adapted to control operation of the PoE protocol circuit 226. The PD control circuitry 238 includes PD detection control circuitry 268 to control operation of the PoE protocol circuitry 226 during a PD detection process. Additionally, the PD control circuitry 238 includes PD classification control circuitry 270 to control operation of the PoE protocol circuitry 226 during a PD classification process that includes PD classification and classification mark signaling.

The PoE protocol circuitry 226 further includes a PD detection switch 250 that is coupled between the multi-use pin 232 and the negative supply pin 224 and which is responsive to a PD detection control signal from the PD detection control circuitry 268 via a control line 252. The PoE protocol circuitry 226 further includes a PD classification switch 254 that is coupled to a first current generator 258 and that is responsive to a PD classification control signal received from the PD classification control circuitry 270 via a control line 256. Further, the PoE protocol circuitry 226 also includes a PD classification mark switch 260 that is coupled to a second current generator 264 and that is responsive to a PD classification mark control signal from the PD classification control circuitry 270 via a control line 262. The first and second current generators 258 and 264 are coupled to the multi-use pin 232 and to the positive supply pin 222. Additionally, the PoE protocol circuitry 226 includes a hot swap switch 266 that is adapted to selectively couple a switched voltage supply terminal 235 to the negative supply pin 224 in response to control signals received from the PD protocol circuitry 238.

In a particular embodiment, the PSE device 202 performs a PD detection process to detect a powered device 204 attached to the network cable 206. As discussed above with respect to FIG. 1, at least one powered device (PD) detection signal is applied to the network cable 206. In a particular embodiment, the PD detection control circuitry 268 is adapted to detect the PD detection signal at the positive supply pin 222. In response to the PD detection signal, the PD detection control circuitry 238 of the powered device 204 generates a control signal via control line 252 to selectively activate the PD detection switch 250 to selectively couple the multi-use pin 232 to the negative power supply pin 224 via a first communication path (i.e., via the PD detection switch 250), to produce a PD detection signature in response to the at least one PD detection signal, which PD detection signature can be detected as a PD detection resistance by the PSE device 202.

The PSE device 202 can optionally perform a PD classification process to classify a power requirement of the powered device 204 that is attached to the network cable 206. The PSE device 202 applies a first PD classification signal to the network cable 206. The PD classification control circuitry 270 is adapted to detect PD classification signals at the positive supply pin 222. In response to the first PD classification signal, the PD classification control circuitry 270 generates a classification control signal via the line 256 to selectively activate the PD classification switch 254 to selectively couple the multi-use pin 232 to the negative power supply pin 224 via the first current generator 258 and the PD classification switch 254 (i.e., a second communication path). In this particular example, the first current generator 258 is coupled between the first and second power supply pins 222 and 224 in parallel with the external resistor 230. The first current generator 258 can be configured as a current mirror or current amplifier to produce a second current that can be aggregated with a current across the external resistor 230 to provide a desired PD classification signature. In a particular example, the first current mirror 258 can include a pair of transistors having different dimensions (different widths and lengths) designed to produce a current that flows through the PD classification switch 254 to the negative power supply pin 224 to provide a desired PD classification signature, which can be detected by the PSE device 202.

Further, if the PSE device 202 applies a PD classification mark signal to the network cable 206, the PD classification control circuitry 270 can be adapted to detect the PD classification mark signal. In response to detecting the PD classification mark signal, the PD classification control circuitry 270 generates a classification mark control signal via the line 262 to selectively activate the PD mark switch 260 to couple the multi-use pin 232 to the second power supply pin 224 via the second current generator 264 and the PD classification mark switch 260 (i.e., a third communication path). In this particular example, the second current generator 264 can be coupled between the between the first and second power supply pins 222 and 224 in parallel with the external resistor 230. The second current generator 264 can be configured as a current mirror or current amplifier to produce another current that can be aggregated with the current across the external resistor 230 to provide a desired PD classification mark signature. In a particular example, the second current mirror 264 can include a pair of transistors having different dimensions (widths and lengths) designed to produce a current that flows through the PD classification mark switch 260 to the negative power supply pin 224 to provide a desired PD classification mark signature, which can be detected by the PSE device 202.

It should be understood that, while the external circuit element is indicated to be an external resistor 230, the multi-use pin 232 and the switching arrangement may be utilized with other logic and with a different external circuit element, depending on the implementation. For example, the multi-use pin 232 could be utilized with an external capacitor to bias a terminal of the capacitor at a first voltage level during a first process and then at a second voltage level during a second process. Further, the multi-use pin 232 may be used with passive circuit components, such as resistors, capacitors, and inductors, with active circuit components, such as transistors, filters, amplifiers, and the like, or with any combination thereof. An example of a more general implementation is described below with respect to FIG. 5.

Furthermore, the multi-use pin 232 and the external resistor 230 can be referenced to other polarities, such as a positive voltage ($V_{POS}$) and a negative voltage ($V_{NEG}$), respectively. Additionally, the internal circuitry can be referenced to any permutation of the positive and negative voltages.

Figure 3:
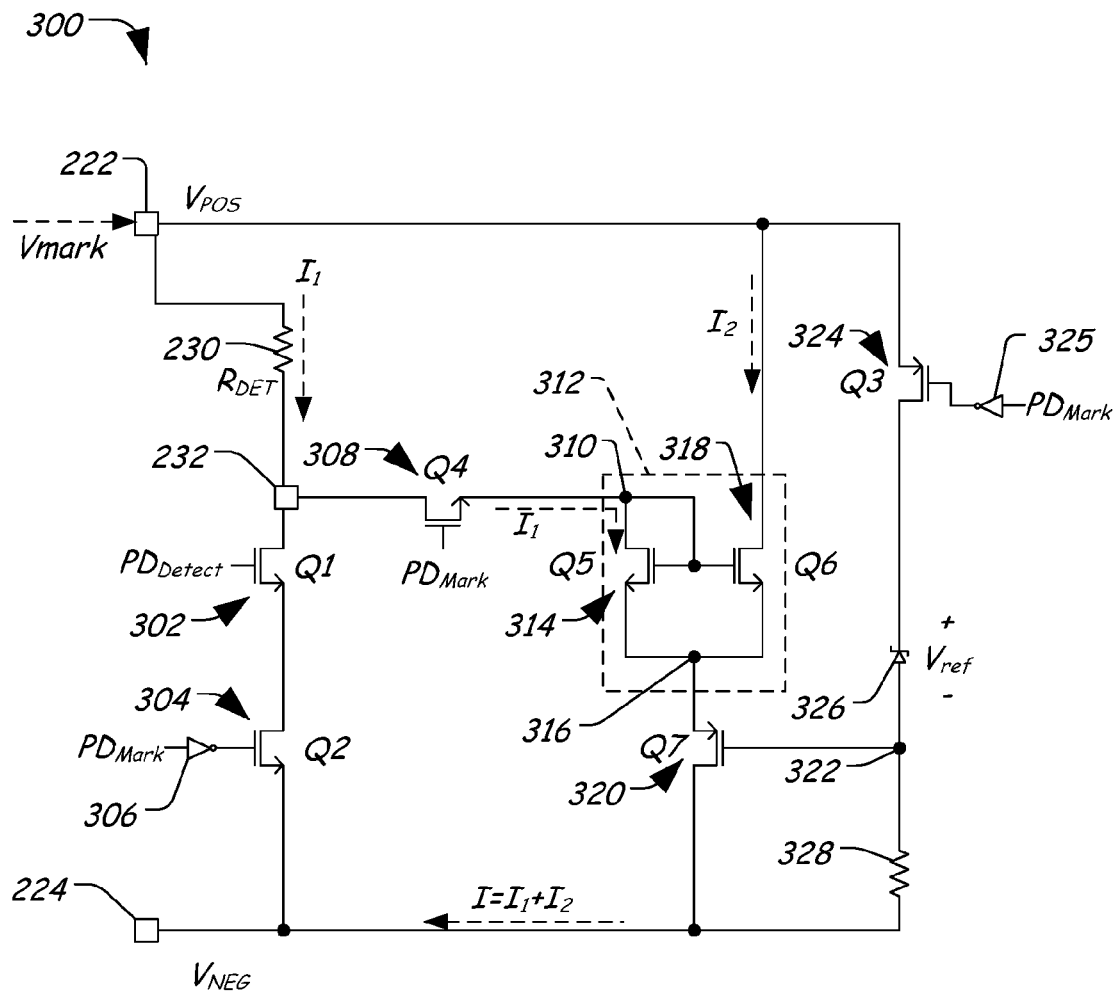
FIG. 3 is a diagram of a particular illustrative embodiment of a portion of an integrated circuit device including circuitry to utilize an external PD detection resistor to selectively provide one of a PD detection signature and a PD classification mark current via a multi-use pin.

FIG. 3 is a diagram of a particular illustrative embodiment of a portion of an integrated circuit device 300 including circuitry to utilize a multi-use pin 232 to reuse an external powered device (PD) detection resistor 230 to selectively provide one of a PD detection signature and a PD classification mark current. The integrated circuit device 300 includes a positive power supply pin 222 and a negative power supply pin 224. The integrated circuit device 300 further includes the multi-use pin 232 and includes an external resistor (PD detection resistor) 230 coupled between the positive power supply pin 222 and the multi-use pin 232. The integrated circuit 300 also includes a PD detection switch 302 including a first terminal coupled to the multi-use pin 232, a second terminal, and a control terminal responsive to PD detection logic (such as the PD detection control circuitry 268 illustrated in FIG. 2). Further, the integrated circuit 300 can include a PD classification mark switch 304 including a third terminal coupled to the second terminal of the PD detection switch 302, a fourth terminal coupled to the negative supply pin 224, and a control terminal coupled to an inverter 306, which inverter is responsive to PD classification mark logic (such as the PD classification control circuitry 270 illustrated in FIG. 2).

The integrated circuit 300 further includes a second PD classification mark switch 308 having a fifth terminal coupled to the multi-use pin 232, a sixth terminal coupled to a node 310, and a control terminal coupled to the PD classification mark logic. The integrated circuit 300 also includes a current mirror (current amplifier) 312 including a first mirror transistor 314 having a first drain terminal coupled to the node 310, a first gate terminal coupled to the node 310, and a first source terminal coupled to a node 316. The current mirror 312 further includes a second mirror transistor 318 including a second drain terminal coupled to the positive power supply pin 222, a second gate terminal coupled to the node 310, and a second source terminal coupled to the node 316. The node 316 is coupled to the negative power supply pin 224 via a source follower circuit 320. The source follower circuit 320 includes a first terminal coupled to the node 316, a second terminal coupled to negative power supply pin 224, and a control terminal coupled to a node 322, which is coupled to the reference voltage ($V_{REF}$) via the reference device 326. The integrated circuit further includes a p-channel PD classification mark transistor 324 including a source terminal coupled to the first power supply pin 222, a control terminal coupled to an inverter 325, which is responsive to PD classification mark logic, and a drain terminal coupled to the node 322 via a reference device 326, which can be used to provide the reference voltage ($V_{REF}$). The node 322 is coupled to the negative power supply pin 224 via a resistor 328.

In a particular embodiment, the first mirror transistor 314 and the second mirror transistor 318 have different dimensions of length and width to multiply a detection current ($I_1$) via the current mirror 312 to produce a second current ($I_2$) that can be larger than the detection current ($I_1$). In a particular embodiment, the second current ($I_2$) can be approximately ten (10) times larger than the detection current ($I_1$) In this particular example, during a PD detection process, the PD detection logic activates the PD detect switch 302 and the PD classification mark logic provides a PD classification mark signal that is turned off (null), which is inverted by the inverter 306 to activate the PD classification mark switch 304 to couple the multi-use pin 232 to the negative power supply terminal 224, coupling the external resistor 230 to the negative power supply terminal 224. Further, the PD classification mark signal (which is off or null) is inverted by the inverter 325 to deactivate the switch 324, forcing all current to flow across the external resistor 230.

During a PD classification process, the PD detection logic deactivates the PD detection switch 302 and the PD classification logic activates the PD classification switch 308 to couple the mirror circuit 312 to the external resistor 230. Current flow across the external resistor 230 flows through the PD classification mark switch 308 and the first mirror transistor 314 to the node 316. The second mirror transistor 318 mirrors the current at the first mirror transistor 314. In a particular example, the second mirror transistor 318 has larger dimensions than the first mirror transistor 314, such that a second current is generated in the second mirror transistor 318 that is larger than the current across the external resistor 230. The larger dimensions of the second mirror transistor 318 cause the second mirror transistor 318 to operate as a current multiplier. Thus, the current mirror 312 is used to produce a desired current from the PSE device based on a current across the external resistor 230 to produce the PD classification signature.

In a particular example, when the PD detection signal is active, the PD classification mark is inactive. In this instance, the switches (Q1 and Q2) 302 and 304 will be on, and the switches (Q3 and Q4) 308 and 324 are inactive. In this case, the resistance seen between the positive and negative power supply pins 222 and 224 is defined by the detection resistor 230.

After PD detection is complete, the positive power supply terminal 222 can receive a PD classification mark signal, and the integrated circuit 300 is placed in a PD classification mark mode. In this instance, a PD classification mark signal is asserted and the PD detection signal is de-asserted, activating switches (Q3 and Q4) 308 and 324 and deactivating switches (Q1 and Q2) 302 and 304. In this example, a current between the first and second power supply pins 222 and 224 can be defined by the following equation:

$$I\text{ mark} = \frac{Vref - Vgs5 - Vgs7}{R\text{ det}}\left(1 + \frac{\frac{W_6}{L_6}}{\frac{W_5}{L_5}}\right), \quad \text{(Equation 1)}$$

where the variable (Imark) represents the PD classification mark signature, the variable (Vref) represents a voltage across the reference device 326, and the variable (Vgs5) represents a gate-source voltage at the first mirror transistor (Q5) 314. Further, the variable (Vgs7) represents a gate-source voltage across the source follower circuit (Q7) 320. Additionally, the variables ($W_6$ and $L_6$) represent width and length dimensions of the second mirror transistor (Q6) 318, and the variables ($W_5$ and $L_5$) represent the width and length dimensions of the first mirror transistor (Q5) 314.

In general, though the current mirror 312 is shown as a single pair of transistors (Q5 and Q6) 314 and 318, it should be understood that any number of current mirror circuit configurations may be used. For example, the current mirror 312 can include multiple current mirrors to produce the second current ($I_2$). In a particular example, the dimensions of each of the current mirrors can be designed to produce the second current ($I_2$), which is an amplified version of the first current ($I_1$).

Figure 4:
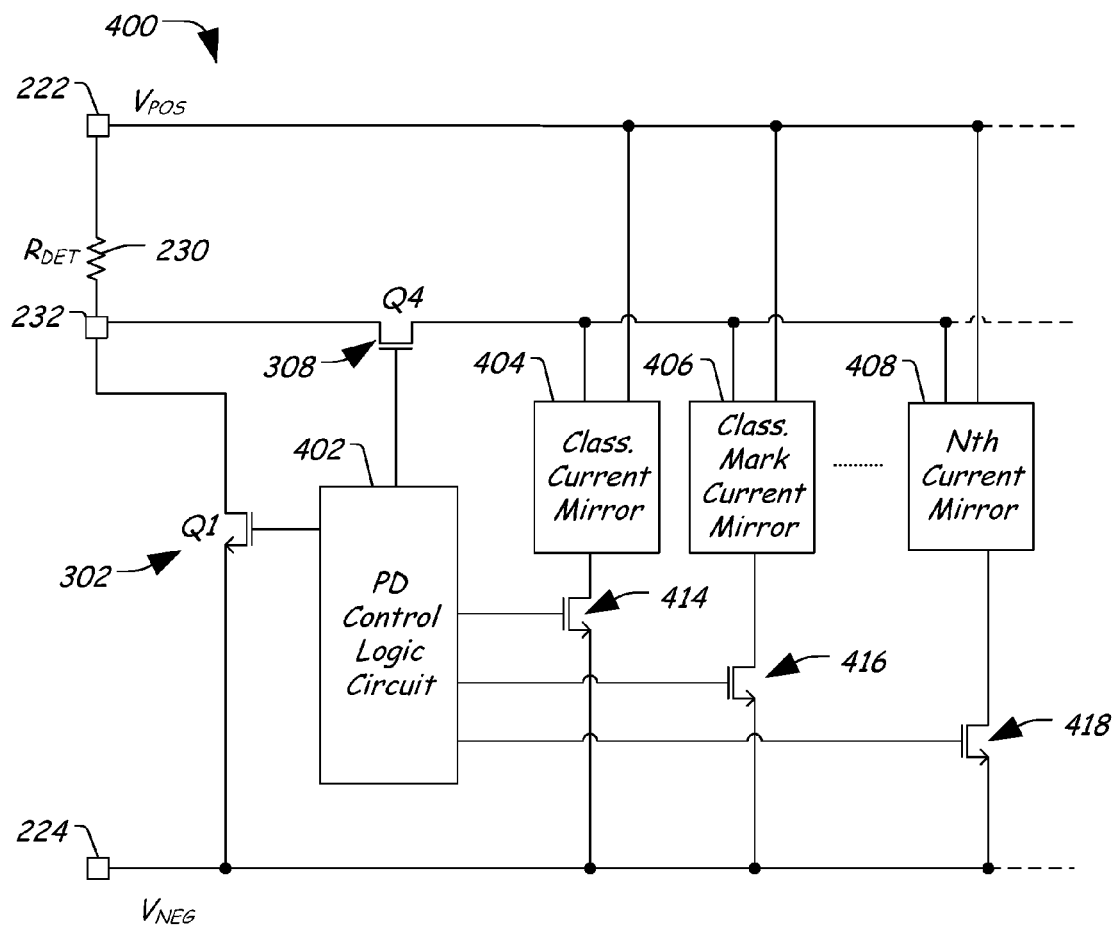
FIG. 4 is a diagram of a particular illustrative embodiment of a portion of an integrated circuit device including circuitry to utilize an external PD detection resistor to selectively provide one of a PD detection signature, a PD classification mark current, and one or more other currents (or PD signatures) via a multi-use pin.

FIG. 4 is a diagram of a particular illustrative embodiment of a portion of an integrated circuit device 400 including circuitry to utilize an external PD detection resistor 230 to selectively provide one of a PD detection signature, a PD classification mark current, and one or more other currents (or PD signatures). The integrated circuit 400 includes positive and negative power supply pins 222 and 224. The integrated circuit 400 further includes a multi-use pin 232, where an external resistor 230 is coupled between the positive power supply pin 222 and the multi-use pin 232. The integrated circuit device 400 further includes a powered device (PD) control logic circuit 402 that is adapted to selectively activate a first switch (Q1) 302 to couple the multi-use pin 232 to the negative power supply pin 224. Additionally, the PD control logic circuit 402 is adapted to selectively activate a switch (Q4) 308 and to deactivate the switch (Q1) 302. Further, the PD control logic circuit 402 is adapted to selectively activate one of a classification current switch 414, a classification mark current switch 416, one or more other current switches 418, or any combination thereof, to selectively couple one of a classification current mirror 404, a classification mark current mirror 406, or one or more other (Nth) current mirrors 408 to the negative power supply terminal 224.

For ease of discussion, only three current mirrors 404, 406 and 408 and three corresponding switches 414, 416, and 418 are shown. However, it should be understood that any number of current mirrors and corresponding switches may be provided, depending on the implementation. In a particular example, the current mirrors may be used to generate multiple currents, which may be used for a reference current, a PD device signature, a PD classification signature, a PD classification mark signature, other currents, or any combination thereof.

In a particular embodiment, the PD control logic circuit 402 is adapted to activate the switch 302 to couple the external resistor 230 to the negative power supply terminal 224 via a first current path in response to a PD detection signal. The PD control logic circuit 402 is further adapted to deactivate the switch 302 and to activate the switch 308 and one or more of the switches 414, 416, and 418 to couple the external resistor to the negative power supply terminal 224 in parallel with one of the classification current mirror 404, the classification mark current mirror 406, and the Nth current mirror 408 via at least one second current path. In a particular embodiment, each of the current mirrors 404, 406, and 408 may be fabricated with different widths and lengths to multiply a current from the external resistor 230 by a gain factor to produce a desired PD signature. In a particular example, the current mirrors 404, 406, and 408 can be adapted to multiply the current across the external resistor 230 by different multipliers to produce multiple current levels ranging from approximately 300 µA to approximately 350 mA, depending on the implementation.

In a particular example, by activating the transistor (Q1) 302 during a PD detection operation, a PD detection signature is produced by current flowing from the positive power supply terminal 222 to the negative power supply terminal 224 across the external resistor 230. During the PD detection operation, if a PD detection voltage of approximately 10 volts is received at the positive power supply terminal 222, the PD detection signature can be a current of approximately 380 µA. In contrast, in response to receiving a PD classification voltage of approximately 18 volts, the PD control logic circuit 402 deactivates the transistor (Q1) 302 and activates the transistor (Q4) 308 and the transistor 414 to couple the classification current mirror 404 in parallel with the external resistor 230 to produce a classification current of approximately 36 mA. In this instance, the classification current mirror 404 can operate as a current source that reduces the effective resistance of the PD circuit to approximately 500Ω. In this instance, the current mirror multiples a current across the external resistor 230 to produce the 36 mA PD classification current.

Further, the PD classification mark current mirror 406 can be selectively activated by the PD control logic circuit 402 to multiply a current across the external resistor (when a 4 volt PD classification mark voltage is received at the positive power supply pin 222) to produce a PD classification mark current (Imark) that is approximately 0.5 mA. In this example, the PD classification mark current mirror 406 makes the PD appear to have an effective resistance of approximately 800 Ω.

In a particular embodiment, any number of current mirrors, such as the N-th current mirror 408, can be provided to produce a corresponding number of currents from a current across the external resistor 230. In each example, the current mirror can be coupled to the external resistor 230 to multiply the current by scaling factor to produce a desired aggregate current. Further, in a particular example, each current mirror can include multiple transistor pairs to produce the desired current.

Figure 5:
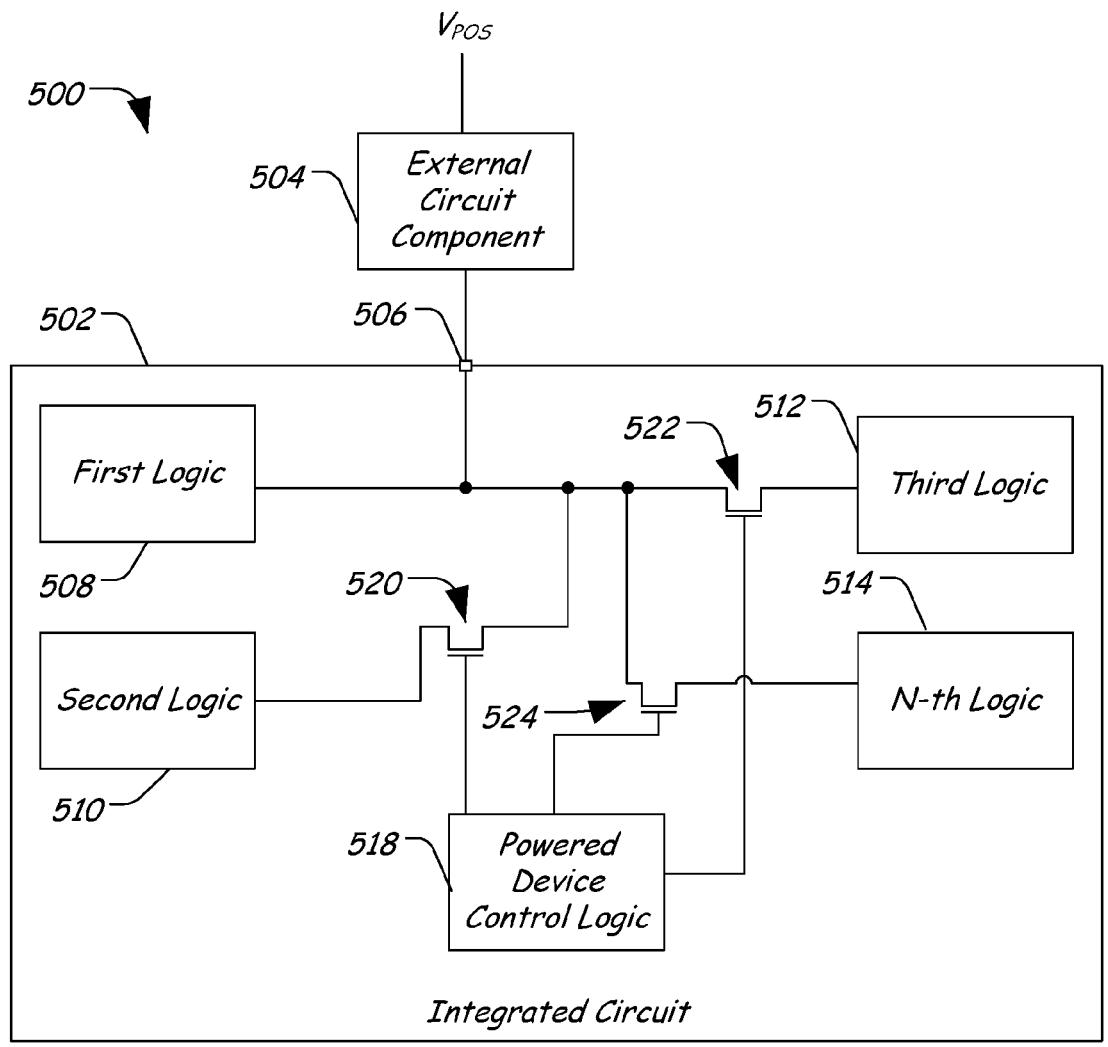
FIG. 5 is a block diagram of a particular illustrative embodiment of an integrated circuit device including a multi-use pin coupled to an external circuit device and including logic circuitry to selectively utilize the external circuit device for different processes via a multi-use pin.

FIG. 5 is a block diagram of a particular illustrative embodiment of a system 500 including an integrated circuit device 502 having a multi-use pin 506 coupled to an external circuit component 504 and including logic circuitry to selectively utilize the external circuit component 504 for different purposes. The integrated circuit device 502 includes first logic 508 to apply a first voltage to the external circuit component 504 via a multi-use pin 506 during a first process. The integrated circuit 502 further includes powered device (PD) control logic 518 to selectively activate a switch 520 to couple second logic 510 to the multi-use pin 506 during a second process. The PD control logic 518 selectively activates a switch 522 to couple third logic 512 to the multi-use pin 506 during a third process. The PD control logic 518 selectively activates a switch 524 to couple fourth logic 514 to the multi-use pin 506 during a fourth process.

In a particular embodiment, the integrated circuit 502 can include any number of logic circuits. Further, each logic circuit 510, 512, and 514 can be adapted to multiply a current at the multi-use pin 506 by a gain factor based on dimensions of a current mirror associated with each of the logic circuits 510, 512, and 514 to produce a desired PD signature.

In a particular alternative embodiment, the external circuit component 504 can be a PD detection resistor, such as the PD detection resistor 230 illustrated in FIG. 2-4. In an alternative embodiment, the external circuit component 504 can include a capacitor to provide a capacitive signature to a PSE device and to function as a filter when a second voltage is applied. In one embodiment, the first process may be a PD detection mode, the second process may be a PD classification mode, a third process may be a PD classification mark mode, and a fourth process may be a normal operating mode, where the external circuit component 504 includes logic to activate other components of the circuit. In an alternative embodiment, the first logic 508 may apply a first current and the second logic 510 may apply a second current to the multi-use pin 506 to generate a voltage across the external circuit component 504, which voltage may produce a PD signature that is detectable by the PSE device.

Figure 6:
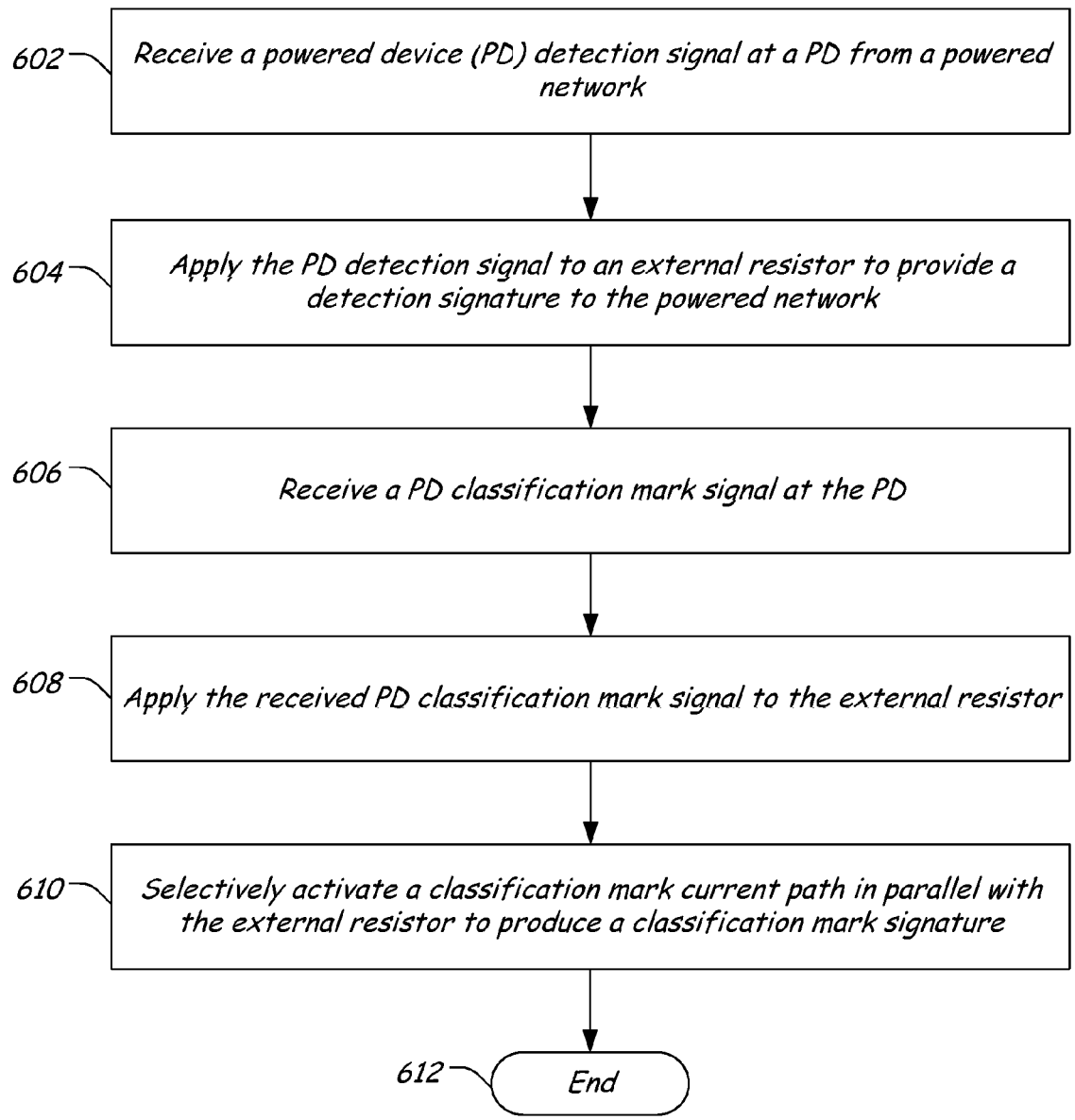
FIG. 6 is a flow diagram of a particular illustrative embodiment of a method of utilizing a detection resistor for multiple applications via a multi-use pin.

FIG. 6 is a flow diagram of a particular illustrative embodiment of a method of utilizing a detection resistor for multiple applications. At 602, a powered device (PD) detection signal is received at a PD from a powered network. Advancing to 604, the PD detection signal is applied to an external resistor to provide a detection signature to the powered network. In a particular embodiment, the external resistor is coupled between a first pin responsive to a first voltage supply terminal and a second pin. In this particular instance, applying the detection voltage to the external resistor includes activating a PD detection switch to couple the second pin to a second voltage supply terminal and isolating a classification mark current mirror from the second pin.

Continuing to 606, a PD classification mark signal is received at the PD. Proceeding to 608, the received PD classification mark signal is applied to the external resistor. Moving to 610, a classification mark current path in parallel with the external resistor is selectively activated to produce a classification mark signature. In a particular embodiment, selectively activating a classification mark current path includes activating a classification mark switch including a first terminal coupled to the external resistor and including a second terminal coupled to a classification mark current mirror, where the classification mark current mirror is adapted to draw a second current that aggregates with a first current across the external resistor to produce the classification mark signature. In another particular embodiment, selectively activating a classification mark current path includes deactivating the PD detection switch to isolate the second pin from the second voltage supply terminal and activating a classification mark switch to couple the second pin to the second voltage supply terminal via the classification mark current path, where the classification mark current path places a current source in parallel with the external resistor. The method terminates at 612.

In a particular embodiment, the method further includes receiving a PD classification signal at the PD, applying the PD classification signal to the external resistor, and selectively activating a classification current path in parallel with the external resistor to produce a classification signature. In this particular example, selectively activating the classification current path includes activating a classification switch including a first terminal coupled to the external resistor and a second terminal coupled to a classification current mirror, where the classification current mirror is adapted to draw a third current that aggregates with a first current across the external resistor to produce a PD classification signature. In another particular embodiment, the method further includes mirroring a current associated with the external resistor to produce a reference current for use by other components.

In conjunction with the circuit devices and methods disclosed herein, a multi-use pin allows an external resistor to be re-used to provide a powered device (PD) detection signature, a PD classification signature, a PD classification mark signature, a reference current, other signals, or any combination thereof. Further, it should be understood that by re-using a pin and an external circuit component for multiple purposes, the overall number of pins may be reduced and the number of external components to provide the various Power over Ethernet (PoE) signals can also be reduced. Further, the external resistor can be re-used for multiple different applications.

While the above-discussion has focused on Power over Ethernet (PoE) implementations, it should be understood that other types of circuits may also be used. Additionally, instead of PoE, other types of data and power supply techniques may be applied whereby data and power are transmitted to the circuit via a common cable. Further, it should be understood that standards, such as the PoE Standard and the PoE+ Standard, may evolve over time. It is anticipated that future revisions may include multiple current signatures and other types of signal hand-shaking that may require additional currents or PD device signals, which currents or PD device signals can be produced using an external circuit component (such as the external resistor) in conjunction with a multi-use pin.

Further, the above-discussion has described particular circuit implementations that are referenced to a particular voltage polarity. However, it should be understood that the polarities at the voltage pin and at the multi-use pin may be referenced to a negative voltage polarity, a positive voltage polarity, another logic level, or any combination thereof. Additionally, the external resistor can be an external resistor circuit that includes one or more resistors in parallel.

Additionally, while the above-described embodiments have focused on Power over Ethernet (PoE) implementations; however, in a particular embodiment, the circuit device can be implemented to make use of an external resistor, such as a high precision external resistor, for multiple purposes. In a particular example, one or more current sources may be selectively coupled in parallel with the external resistor to provide one or more signals. By adjusting the dimensions, the structure, or any combination thereof of the transistors that are used to form the current mirror, multiple possible current signals may be generated that are related to a signal applied to the external resistor.

Although the present invention has been described with reference to preferred embodiments, workers skilled in the art will recognize that changes may be made in form and detail without departing from the spirit and scope of the invention.

What is claimed is:

1. A method comprising:
receiving a powered device (PD) detection signal at a PD from a powered network;
applying the PD detection signal to an external resistor to provide a detection signature to the powered network;
receiving a PD classification mark signal at the PD;
applying the received PD classification mark signal to the external resistor; and
selectively activating a classification mark current path in parallel with the external resistor to produce a classification mark signature.

2. The method of claim 1, wherein selectively activating a classification mark current path comprises:
activating a classification mark switch including a first terminal coupled to the external resistor and including a second terminal coupled to a classification mark current mirror;
wherein the classification mark current mirror is adapted to draw a second current that aggregates with a first current across the external resistor to produce the classification mark signature.

3. The method of claim 1, further comprising:
receiving a PD classification signal at the PD;
applying the PD classification signal to the external resistor; and
selectively activating a classification current path in parallel with the external resistor to produce a classification signature.

4. The method of claim 3, wherein selectively activating the classification current path comprises:

activating a classification switch including a first terminal coupled to the external resistor and a second terminal coupled to a classification current mirror;

wherein the classification current mirror is adapted to draw a third current that aggregates with a first current across the external resistor to produce a PD classification signature.

5. The method of claim 1, further comprising mirroring a current associated with the external resistor to produce a reference current for use by other components.

6. The method of claim 1, wherein the external resistor is coupled between a first pin responsive to a first voltage supply terminal and a second pin, wherein applying the detection voltage to the external resistor comprises:

activating a PD detection switch to couple the second pin to a second voltage supply terminal; and isolating a classification mark current mirror from the second pin.

7. The method of claim 6, wherein selectively activating a classification mark current path comprises:

deactivating the PD detection switch to isolate the second pin from the second voltage supply terminal; and activating a classification mark switch to couple the second pin to the second voltage supply terminal via the classification mark current path, wherein the classification mark current path places a current source in parallel with the external resistor.

8. A Power over Ethernet (PoE) powered device comprising:

an external resistor including a first terminal and a second terminal; and an integrated circuit comprising:

a first pin coupled to the first terminal of the external resistor and coupled to a first power supply terminal;

a second pin coupled to the second terminal of the external resistor;

a first logic circuit to selectively couple the second pin to a second power supply terminal via a first current path in response to a powered device (PD) detection signal to produce a PD detection signature; and a second logic circuit to selectively couple the second pin to the second power supply terminal via a second current path in response to a PD classification mark signal, the second current path including a current source in parallel with the external resistor to produce a PD classification mark signature.

9. The PoE powered device of claim 8, further comprising a third logic circuit to selectively couple the second pin to the second power supply terminal via a third current path in response to a PD classification signal, the third current path including a second current source in parallel with the external resistor to produce a PD classification signature.

10. The PoE powered device of claim 8, further comprising a fourth logic circuit to selectively couple at least one of the first and second pins to a reference voltage circuit to produce a reference current using the external resistor in response to receiving a power supply related to a PD classification related to the PD classification signal.

11. The PoE powered device of claim 8, wherein the PoE powered device further comprises an interface responsive to a powered network to receive power and data via a network cable.

12. The PoE powered device of claim 11, wherein the first logic circuit comprises:

a first switch coupled between the second pin and the second power supply terminal; and a PD control circuit coupled to the interface and adapted to detect the PD detection signal, the PD control circuit to selectively activate the first switch in response to detecting the PD detection signal.

13. The PoE powered device of claim 12, wherein the second logic circuit comprises a second switch including a first terminal coupled to the second pin and to the current source, a control terminal coupled to the PD control circuit; and a second terminal coupled to the second power supply terminal.

14. The PoE powered device of claim 12, wherein the PD classification mark signal comprises a voltage signal that is received after receiving at least one PD classification signal.

15. A circuit device comprising:

an interface coupled to a cable to receive power and data;

a first power supply terminal coupled to the interface;

a second power supply terminal coupled to the interface;

a first pin coupled to the first power supply terminal and to a first terminal of an external resistor;

a second pin coupled to a second terminal of the external resistor;

logic circuitry coupled to the interface and adapted to:

detect a first signal at the interface;

selectively couple the second pin to the second power supply terminal via a first current path in response to detecting the first signal to produce a first current;

detect a second signal at the interface; and selectively couple the second pin to the second power supply terminal via a second current path that places a first current source in parallel with the external resistor in response to detecting the second signal to produce a second current.

16. The circuit device of claim 15, wherein the first current source includes a current mirror circuit comprising:

a first transistor including a first terminal coupled to the second pin, a first control terminal coupled to the first terminal, and a second terminal coupled to the second power supply terminal; and a second transistor including a third terminal coupled to the first power supply terminal, a second control terminal coupled to the first control terminal, and a fourth terminal coupled to the second power supply terminal.

17. The circuit device of claim 16, wherein the current mirror circuit further includes at least one second transistor pair coupled in series with the first and second transistors to produce the second current.

18. The circuit device of claim 16, wherein the second transistor has a second width that is greater than a first width of the first transistor.

19. The circuit device of claim 16, wherein the second transistor is adapted to generate a second current that is larger than a first current associated with the first transistor.

20. The circuit device of claim 15, wherein, before receiving the second signal, the logic circuitry is further adapted to:

detect a third signal at the interface; and selectively couple the second pin to the second power supply terminal via a third current path that places a second current source in parallel with the external resistor in response to detecting the third signal to produce a third current.

21. The powered device of claim 15, wherein, after producing the second current, the logic circuitry is adapted to selectively couple the first pin to a reference voltage source to produce a reference current.

* * * * *